United States Patent
Tseng

(10) Patent No.: US 9,992,793 B2
(45) Date of Patent: Jun. 5, 2018

(54) METHOD AND APPARATUS FOR PERFORMING BUFFER STATUS REPORTING

(75) Inventor: Li-Chih Tseng, Taipei (TW)

(73) Assignee: INNOVATIVE SONIC LIMITED, Eben (MU)

( * ) Notice: Subject to any disclaimer, the term of this patent is extended or adjusted under 35 U.S.C. 154(b) by 1024 days.

(21) Appl. No.: 12/395,705

(22) Filed: Mar. 1, 2009

(65) Prior Publication Data

US 2009/0221281 A1    Sep. 3, 2009

Related U.S. Application Data

(60) Provisional application No. 61/033,020, filed on Mar. 3, 2008.

(51) Int. Cl.
*H04W 24/00* (2009.01)
*H04W 72/12* (2009.01)
*C09D 133/12* (2006.01)

(52) U.S. Cl.
CPC ...... *H04W 72/1284* (2013.01); *C09D 133/12* (2013.01); *C08L 2205/02* (2013.01)

(58) Field of Classification Search
USPC ............ 455/422.1–425; 710/56–57; 370/329
See application file for complete search history.

(56) References Cited

U.S. PATENT DOCUMENTS

| 8,543,054 | B2 * | 9/2013 | Ostergaard et al. ............. 455/7 |
| 2009/0113086 | A1 * | 4/2009 | Wu et al. ........................ 710/56 |
| 2009/0125650 | A1 * | 5/2009 | Sebire ............................. 710/57 |
| 2009/0191882 | A1 * | 7/2009 | Kovacs et al. ................ 455/450 |
| 2010/0254321 | A1 * | 10/2010 | Kim et al. .................... 370/329 |

FOREIGN PATENT DOCUMENTS

| TW | 200926860 A | 6/2009 |
| WO | 2007147431 A1 | 12/2007 |

OTHER PUBLICATIONS

3GPP, R2-081389 3GPP TSG-RAN WG2, "E-UTRA MAC protocol specification update", Feb. 2008.
LG Electronics Inc.: "Discussion on Buffer Status Reporting Procedure", 3GPP TSG-RAN WG2 #61, R2-081084, XP050138870, Feb. 11-15, 2008, Sorrento, Italy.
Nokia Corporation, Nokia Siemens Networks: "Criteria for Short and Long BSR", 3GPP TSG-RAN WG2 Meeting #60bis, R2-080015, XP050137919, Jan. 14-18, 2008, Sevilla, Spain.
Nokia: "Buffer Reporting for E-UTRAN", 3GPP TSG-RAN WG2 Meeting #52, R2-060829, XP003013941, Mar. 27-31, 2006, Athens, Greece.
Office Action on corresponding foreign application (TW98106840) from TIPO dated Nov. 27, 2012.

* cited by examiner

*Primary Examiner* — Shahriar Behnamian
(74) *Attorney, Agent, or Firm* — Blue Capital Law Firm, P.C.

(57) ABSTRACT

The present invention provides a method for performing Buffer Status Reporting (BSR) in a user equipment (UE) of a wireless communication system. The method includes steps of triggering a BSR procedure when a predefined condition is satisfied, and using a short-format BSR control element to perform BSR when no buffered data exists in every logic channel group of the UE.

12 Claims, 4 Drawing Sheets

METHOD AND APPARATUS FOR PERFORMING BUFFER STATUS REPORTING

CROSS REFERENCE TO RELATED APPLICATIONS

This application claims the benefit of U.S. Provisional Application No. 61/033,020, filed on Mar. 3, 2008 and entitled "Empty BSR (buffer status report) reporting and DRX command", the contents of which are incorporated herein by reference.

BACKGROUND OF THE INVENTION

1. Field of the Invention

The present invention relates to a method and apparatus for performing buffer status reporting (BSR), and more particularly, to a method and apparatus for deciding a BSR control element format when performing BSR.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE, MAC provides transmission services via a plurality of logic channels. To manage uplink resources, when a user equipment (UE) performs uplink (UL) transmission, the network can divide or map logic channels of the UE into at most four groups based on priorities, types, and so on. The priorities are corresponding to values 1 to 8, and assigned by a higher layer, the radio resource control layer. Besides, the 3rd Generation Partnership Project, 3GPP, introduces a Buffer Status Reporting (BSR) procedure, which is used to provide the serving NB (or enhanced NB) with information about the amount of data in UL buffers of the UE. In the BSR procedure, the UE uses a MAC PDU (Protocol Data Unit) to carry a BSR control element, so as to report information about the amount of data in the UL buffers to the network. Accordingly, the network can determine the total amount of data available across one or all logical channel groups.

In the current specification, there are three types of BSR procedures for different triggering events, a regular BSR, a periodic BSR and a padding BSR. The regular BSR is triggered when UL data arrives at the UE transmission buffer and the UL data belongs to a logical channel with higher priority than those for which data already existed in the UE transmission buffer, or is triggered when a serving cell change occurs. The periodic BSR is triggered when a periodic BSR timer expires. The padding BSR is triggered when UL resources are allocated and an amount of padding bits is equal to or greater than the size of the BSR MAC control element.

Besides, according to different requirements, the BSR MAC control elements can be categorized into two formats: short and long. A short-format BSR control element is 1-byte long, and has 8 bits, where the former 2 bits indicate one logic channel group which buffer status is being reported, and the remaining six bits indicate the amount of data available across the logic channel group. A long-format BSR control element is three-byte long, and utilized for reporting data amount of the UL buffers of all the logic channel groups. Detailed description of the two formats can be found in related protocol specifications, and not narrated herein.

For regular and periodic BSR, the BSR control element format is determined by the UE according to whether more than one logic channel groups has buffered data when the BSR is transmitted. If only one logic channel group had buffer data, the short-format BSR control element is reported; otherwise, if more than one logic channel groups have buffered data, the long-format BSR control element is reported.

However, based on the related protocol specifications, when UL resources for new transmission is available to perform BSR after the regular or periodic BSR is triggered due to a serving cell change or expiration of the periodic BSR timer, for example, if every logic channel group of the UE exists no buffered data, i.e. the amount of data in the UL buffers of every logic channel group is 0, the prior art does not disclose which kind of the BSR control element format shall be used in this situation.

SUMMARY OF THE INVENTION

It is therefore an objective of the present invention to provide a method and apparatus for performing buffer status reporting (BSR) for a user equipment of a wireless communications system, so as to decide a format of a BSR control element.

According to the present invention, a method for performing buffer status reporting (BSR) in a user equipment (UE) of a wireless communication system is disclosed. The method includes steps of triggering a BSR procedure when a predefined condition is satisfied; and using a short-format BSR control element to perform BSR when there exist no buffered data in every logic channel group of the UE.

According to the present invention, a communications device of a wireless communication system for a user equipment (UE) performing buffer status reporting is disclosed. The communications device includes a processor for executing a program code, and a memory, coupled to the processor, for storing the program code. The process includes steps of triggering a BSR procedure when a predefined condition is satisfied; and using a short-format BSR control element to perform BSR when there exist no buffered data in every logic channel group of the UE.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
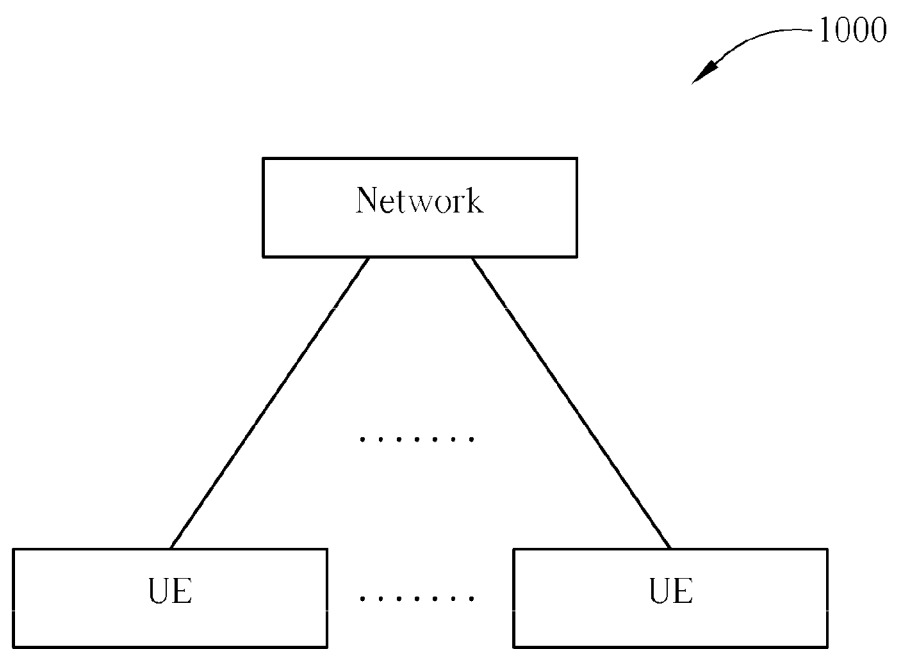
FIG. 1 is a schematic diagram of a wireless communications system.

Please refer to FIG. 1, which illustrates a schematic diagram of a wireless communication system 1000. The wireless communication system 1000 is preferably an LTE (long-term evolution) system, and is briefly composed of a network and a plurality of UEs. In FIG. 1, the network and the UEs are simply utilized for illustrating the structure of the wireless communication system 1000. Practically, the network may comprise a plurality of base stations (Node Bs), radio network controllers and so on according to actual demands, and the UEs can be devices such as mobile phones, computer systems, etc.

Figure 2:
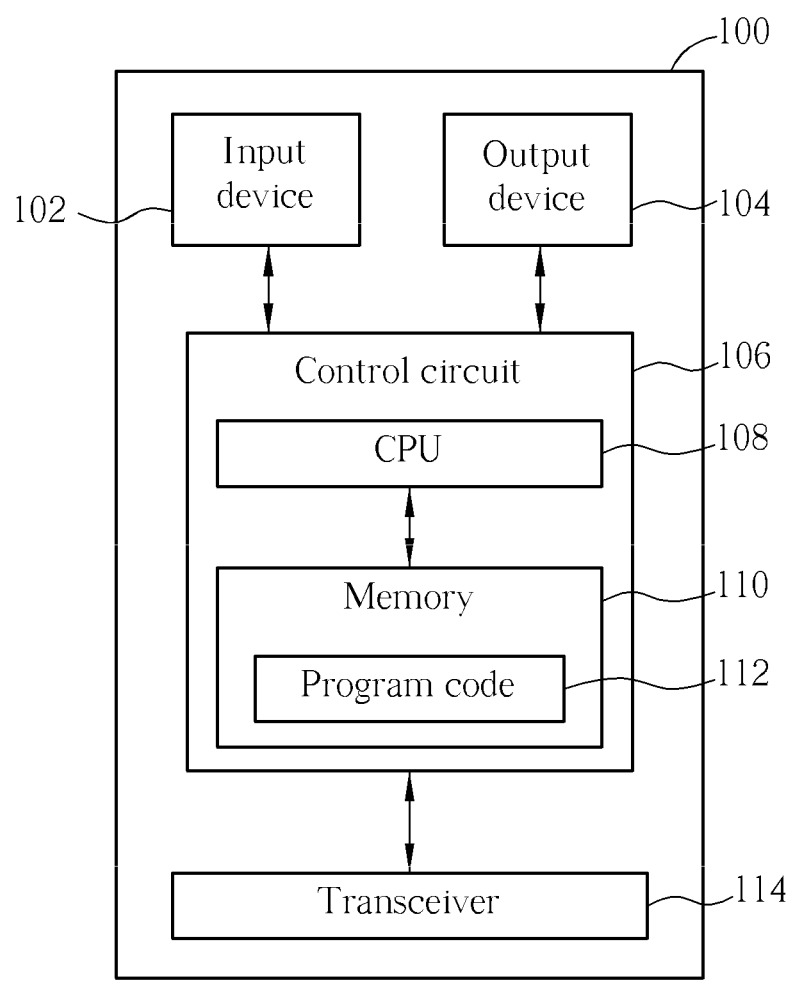
FIG. 2 is a function block diagram of a wireless communications device.

Please refer to FIG. 2, which is a functional block diagram of a communication device 100 in a wireless communication system. For the sake of brevity, FIG. 2 only shows an input device 102, an output device 104, a control circuit 106, a central processing unit (CPU) 108, a memory 110, a program code 112, and a transceiver 114 of the communication device 100. In the communication device 100, the control circuit 106 executes the program code 112 in the memory 110 through the CPU 108, thereby controlling an operation of the communication device 100. The communication device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communication protocol framework, the transceiver 114 can be seen as a portion of Layer 1, and the control circuit 106 can be utilized to realize functions of Layer 2 and Layer 3.

Figure 3:
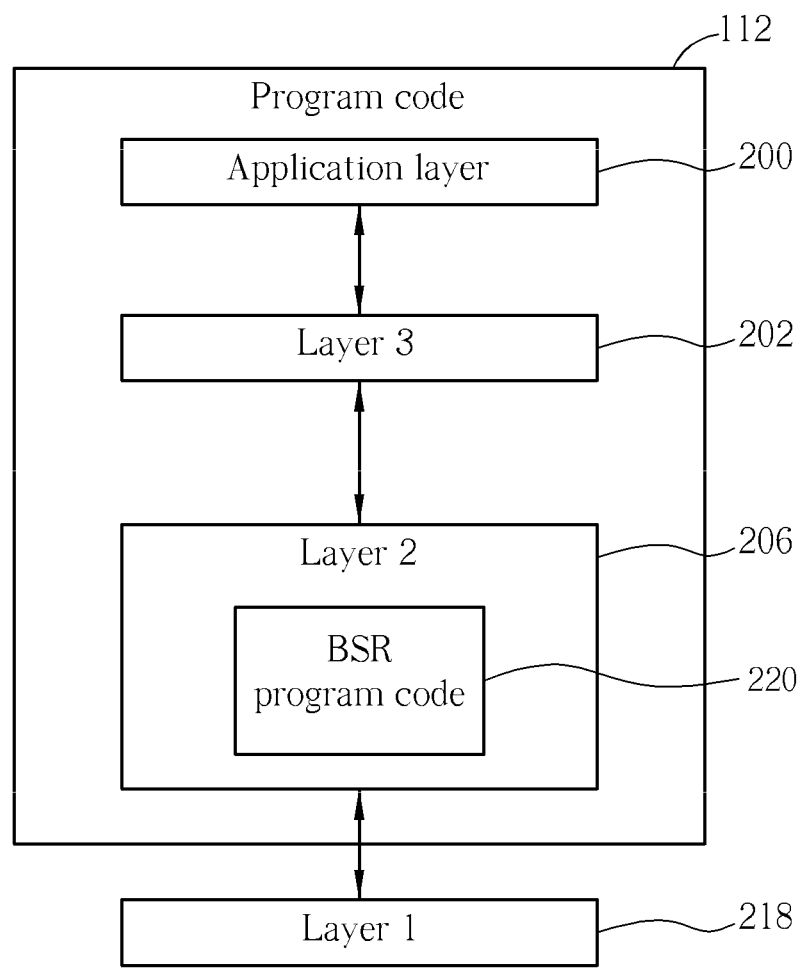
FIG. 3 is a diagram of program code of FIG. 2.

Please continue to refer to FIG. 3, which is a diagram of the program code 112 shown in FIG. 2. The program code 112 includes an application layer 200, a Layer 3 202, and a Layer 2 206, and is coupled to a Layer 1 218. The Layer 3 202 performs radio resource control. The Layer 2 206 comprises an RLC layer and a MAC layer, and performs link control. The Layer 1 218 performs physical connections.

In LTE, the MAC layer of the Layer 2 206 can perform a Buffer Status Reporting (BSR) procedure to report information about the amount of data in the UL buffers to the network via a BSR MAC control element. Accordingly, the network can determine the total amount of data available across one or all logical channel groups. In such a situation, the embodiment of the present invention provides a BSR program code 220 to decide a format of the BSR MAC control element when every logic channel group of the UE has no buffered data after the BSR procedure is triggered.

Figure 4:
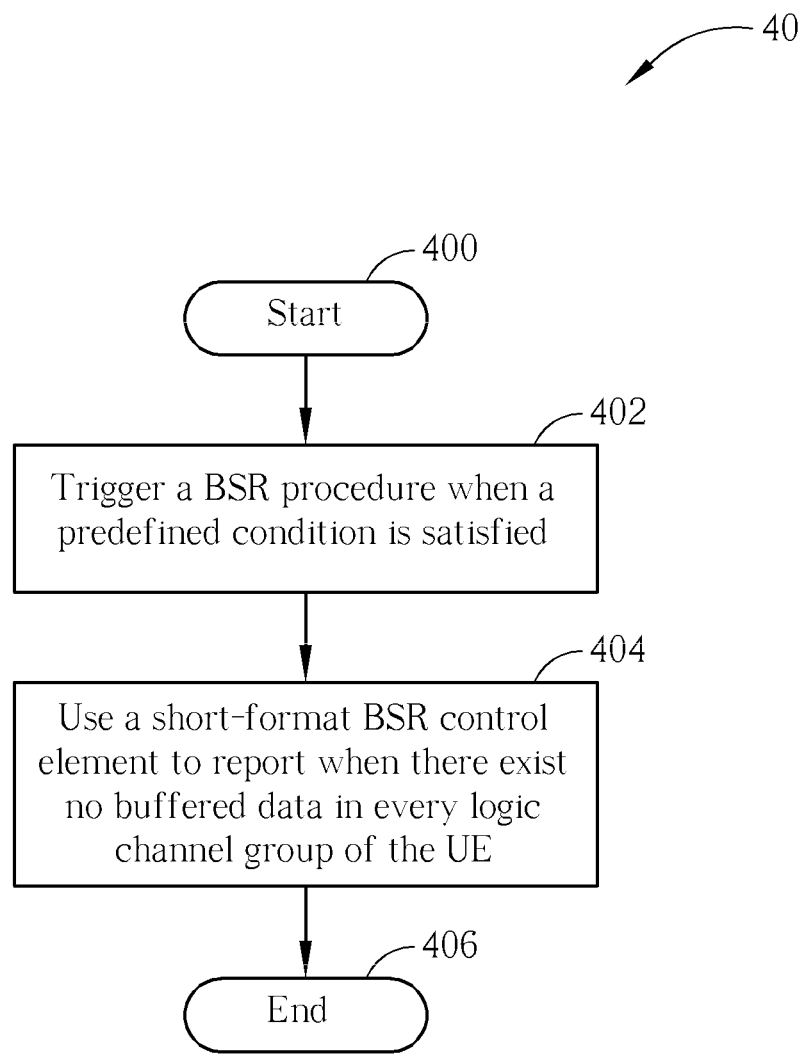
FIG. 4 is a flowchart of a process according to an embodiment of the present invention.

Please refer to FIG. 4, which illustrates a schematic diagram of a process 40. The process 40 is utilized for performing BSR in a UE of the wireless communication system 1000 to decide a BSR control element format. The process 40 comprises the following steps:

Step 400: Start.

Step 401: Trigger a BSR procedure when a predefined condition is satisfied.

Step 402: Use a short-format BSR control element to perform BSR when there exist no buffered data in every logic channel group of the UE.

Step 404: End.

According to the process 40, a BSR procedure is triggered by the UE when a predefined condition is satisfied. The predefined condition is satisfied when a periodic BSR timer expires or when a serving cell of the UE is changed. When performing BSR, if there exists no buffered data in every logic channel group of the UE, a short-format BSR control element is used.

That is to say, when UL resources for new transmission is available to perform BSR after the BSR procedure is triggered due to a serving cell change or expiration of the periodic BSR timer, for example, if every logic channel group of the UE has no buffered data, i.e. the amount of data in the UL buffers of every logic channel group is 0, the UE would include the short-format BSR control element into a MAC PDU (Protocol Data Unit) to perform the BSR in the embodiment of the present invention.

Preferably, the short-format BSR control element is utilized for indicating the amount of data in a uplink buffer of a highest priority logic channel group of the UE, but is not limited herein. For example, in another embodiment of the present invention, the short-format BSR control element can also indicate the amount of data in a uplink buffer of any logic channel group of the UE. Such variation also belongs to the scope of the present invention.

In summary, when UL resources for new transmission is available to perform BSR after the BSR procedure is triggered, if every logic channel group of the UE has no buffered data, the embodiment of the present invention uses the short-format BSR control element for reporting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing buffer status reporting (BSR) in a user equipment (UE) of a wireless communication system, the method comprising:
   triggering a periodic BSR procedure when a periodic reporting timer expires; and
   using a short-format BSR control element to perform (rather than cancel) the triggered BSR, when there exist no buffered data in every logic channel group of the UE,
   wherein the UE includes the short-format BSR control element in a Media Access Control (MAC) Protocol Data Unit (PDU) without data.

2. The method of claim 1, wherein the short-format BSR control element includes information to indicate an amount of data in an uplink buffer of a highest priority logic channel group of the UE.

3. The method of claim 1, wherein the short-format BSR control element includes information to indicate an amount of data in an uplink buffer of any logic channel group of the UE.

4. A communication device of a wireless communication system for a user equipment (UE) performing a buffer status reporting, the communication device comprising:
   a processor for executing a program code; and
   a memory coupled to the processor for storing the program code;
   wherein the program code comprises:
      triggering a periodic BSR procedure when a periodic reporting timer expires; and
      using a short-format BSR control element to perform (rather than cancel) the triggered BSR when there exist no buffered data in every logic channel group of the UE,
      wherein the UE includes the short-format BSR control element into a Media Access Control (MAC) Protocol Data Unit (PDU) without data.

5. The communication device of claim 4, wherein the short-format BSR control element includes information to indicate an the amount of data in an uplink buffer of a highest priority logic channel group of the UE.

6. The communication device of claim 4, wherein the short-format BSR control element includes information to indicate an amount of data in an uplink buffer of any logic channel group of the UE.

7. A method for performing buffer status reporting (BSR) in a user equipment (UE) of a wireless communication system, the method comprising:
 triggering a BSR procedure when a serving cell of the UE is changed; and
 using a short-format BSR control element to perform (rather than cancel) the triggered BSR when there exist no buffered data in every logic channel group of the UE,
 wherein the UE includes short-format BSR control element into a Media Access Control (MAC) Protocol Data Unit (PDU) without data.

8. The method of claim 7, wherein the short-format BSR control element includes information to indicate an amount of data in an uplink buffer of a highest priority logic channel group of the UE.

9. The method of claim 7, wherein the short-format BSR control element includes information to indicate an amount of data in an uplink buffer of any logic channel group of the UE.

10. A communication device of a wireless communication system for a user equipment (UE) performing a buffer status reporting, the communication device comprising:
 a processor for executing a program code; and
 a memory coupled to the processor for storing the program code;
 wherein the program code comprises:
  triggering a BSR procedure when a serving cell of the UE is changed; and
  using a short-format BSR control element to perform (rather than cancel) the triggered BSR when there exist no buffered data in every logic channel group of the UE,
  wherein the UE includes the short-format BSR control element into a Media Access Control (MAC) Protocol Data Unit (PDU) without data.

11. The communication device of claim 10, wherein the short-format BSR control element includes information to indicate an amount of data in an uplink buffer of a highest priority logic channel group of the UE.

12. The communication device of claim 10, wherein the short-format BSR control element includes information to indicate an amount of data in an uplink buffer of any logic channel group of the UE.

* * * * *